United States Patent
Novak et al.

(10) Patent No.: US 9,405,767 B2
(45) Date of Patent: Aug. 2, 2016

(54) STREAMING CONTENT AND PLACEHOLDERS

(71) Applicant: Microsoft Corporation, Redmond, WA (US)

(72) Inventors: Michael John Novak, Redmond, WA (US); Chris Guzak, Kirkland, WA (US); Sangeeta Ranjit, NewCastle, WA (US); Scott David Hoogerwerf, Seattle, WA (US); Amnon Itamar Govrin, Issaquah, WA (US); Kiernon Reiniger, Snohomish, WA (US); David C Fields, Kirkland, WA (US); Ramanarayanan Ramani, Seattle, WA (US); Raghu Krishnamurhty, Bellevue, WA (US); Subha Santhanam, Redmond, WA (US); Oded Yehuda Shekel, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/874,488

(22) Filed: May 1, 2013

(65) Prior Publication Data

US 2014/0330874 A1    Nov. 6, 2014

(51) Int. Cl.
*G06F 17/30* (2006.01)

(52) U.S. Cl.
CPC .... *G06F 17/30194* (2013.01); *G06F 17/30115* (2013.01); *G06F 17/30165* (2013.01)

(58) Field of Classification Search
None
See application file for complete search history.

(56) References Cited

U.S. PATENT DOCUMENTS

| | | | |
|---|---|---|---|
| 5,721,916 A | 2/1998 | Pardikar | |
| 7,441,011 B2 | 10/2008 | Lin et al. | |
| 7,603,397 B1 | 10/2009 | Hagerstrom et al. | |
| 8,331,566 B1 | 12/2012 | Foote et al. | |
| 8,417,746 B1 | 4/2013 | Gillett, Jr. et al. | |
| 8,468,070 B1* | 6/2013 | Scofield et al. | 705/34 |
| 2002/0073214 A1 | 6/2002 | Iinuma et al. | |
| 2004/0019613 A1 | 1/2004 | Jones et al. | |
| 2004/0049513 A1 | 3/2004 | Yakir et al. | |
| 2004/0267812 A1 | 12/2004 | Harris et al. | |

(Continued)

FOREIGN PATENT DOCUMENTS

| | | |
|---|---|---|
| WO | 95/23376 A1 | 8/1995 |
| WO | 2008/095237 A1 | 8/2008 |
| WO | 2013/036920 A1 | 3/2013 |

OTHER PUBLICATIONS

"International Search Report & Written Opinion for PCT Patent Application No. PCT/US2013/061056", Mailed Date: Jan. 2, 2014, Filed Date: Sep. 20, 2013, 9 Pages.

(Continued)

*Primary Examiner* — Jay Morrison
(74) *Attorney, Agent, or Firm* — Judy Yee; Micky Minhas (57) ABSTRACT

Aspects of the subject matter described herein relate to file system placeholders. In aspects, placeholders may be used by a client to represent remote file system objects. The placeholders may include metadata and may also include none, some, or all of the content of the represented remote file system objects. In response to a request to access content of a file system object represented by a placeholder, a client may obtain needed data from a remote storage system and stream or not stream the data to the requesting application based on whether the requesting application is capable of streaming the data.

19 Claims, 6 Drawing Sheets

(56) References Cited

U.S. PATENT DOCUMENTS

| | | | |
|---|---|---|---|
| 2005/0198385 A1 | | 9/2005 | Aust et al. |
| 2005/0210119 A1 | | 9/2005 | Kumar et al. |
| 2006/0129627 A1 | * | 6/2006 | Phillips et al. ............... 709/200 |
| 2006/0155943 A1 | | 7/2006 | Todd et al. |
| 2006/0200570 A1 | | 9/2006 | Stirbu et al. |
| 2006/0224993 A1 | | 10/2006 | Wong et al. |
| 2006/0253501 A1 | | 11/2006 | Langan et al. |
| 2008/0010325 A1 | | 1/2008 | Yamakawa |
| 2008/0095237 A1 | | 4/2008 | Hussain et al. |
| 2008/0256532 A1 | * | 10/2008 | Xie et al. ...................... 717/178 |
| 2009/0030620 A1 | * | 1/2009 | Novo et al. ...................... 702/21 |
| 2009/0172274 A1 | | 7/2009 | Nochimowski et al. |
| 2009/0193107 A1 | | 7/2009 | Srinivasan et al. |
| 2010/0100427 A1 | | 4/2010 | McKeown et al. |
| 2010/0325199 A1 | | 12/2010 | Park et al. |
| 2011/0099212 A1 | | 4/2011 | Hahn et al. |
| 2012/0110015 A1 | | 5/2012 | Nath et al. |
| 2012/0158891 A1 | | 6/2012 | Dooley et al. |
| 2012/0167074 A1 | | 6/2012 | Rajpure et al. |
| 2012/0179553 A1 | | 7/2012 | Duggal |
| 2012/0215820 A1 | | 8/2012 | Ogasawara et al. |
| 2013/0007263 A1 | * | 1/2013 | Soroushian et al. .......... 709/224 |
| 2013/0036135 A1 | | 2/2013 | Brockey et al. |
| 2014/0250069 A1 | | 9/2014 | Lakshminarayanan et al. |

OTHER PUBLICATIONS

"International Search Report & Written Opinion for PCT Patent Application No. PCT/US2013/060250", Mailed Date: Jan. 2, 2014, Filed Date: Sep. 18, 2013, 9 Pages.

"International Search Report & Written Opinion for PCT Patent Application No. PCT/US2013/061071", Mailed Date: Jan. 2, 2014, Filed Date: Sep. 21, 2013, 10 Pages.

International Search Reports, PCT/US2013/061072, filed Sep. 21, 2013; Report mailed Feb. 21, 2014.

Marino, et al., "A Virtual File System for the Coordinated Management of Geographically Dispersed Archives", Retrieved at<<http://books.google.co.in/books?hl=en&lr=&id=5wo_X_zaUQ8C&oi=fnd&pg=PA349&dq=A+virtual+file+system+for+the+coordinated+management+of+geographically+dispersed++archives&ots=PHRY8QTvhn&sig=E7E3HyOBPn5zbRytecgOhELkJ2Q#v=onepage&q&f=false>>, In Conference Proceeding of AUUG, Sep. 25, 1991, pp. 9.

"Basic Concepts", Retrieved at <<http://technet.microsoft.com/en-us/library/cc938459.aspx>>, Mar. 16, 2011, pp. 3.

U.S. Appl. No. 13/873,241, filed Apr. 30, 2013, Novak, et al.

U.S. Appl. No. 13/874,474, filed Apr. 30, 2013, Novak, et al.

U.S. Appl. No. 13/873,264, filed Apr. 30, 2013, Novak, et al.

U.S. Patent Application entitled "File Management With Placeholders"; First named inventor: Michael John Novak; Filed: Apr. 30, 2013; U.S. Appl. No. 13/873,241.

U.S. Patent Application entitled "Hydration and Dehydration With Placeholders"; First named inventor: Michael John Novak; Filed: Apr. 30, 2013; U.S. Appl. No. 13/874,474.

U.S. Patent Application entitled "Searching and Placeholders"; First named inventor: Michael John Novak; Filed: Apr. 30, 2013; U.S. Appl. No. 13/873,264.

Non Final Office Action Issued in U.S. Appl. No. 13/874,488, mailed Mar. 27, 2015.

Final Office Action Issued in U.S. Appl. No. 113/874,488, mailed Aug. 14, 2015.

Non Final Office Action Issued in U.S. Appl. No. 13/874,474, mailed Apr. 6, 2015.

Non Final Office Action Issued in U.S. Appl. No. 13/873,241, mailed Apr. 1, 2015.

Final Office Action Issued in U.S. Appl. No. 13/873,241, mailed Sep. 24, 2015.

Office Action for U.S. Appl. No. 13/873,264, mailed Apr. 9, 2015.

Notice of Allowance, U.S. Appl. No. 13/873,264, mailed Aug. 14, 2015.

Notice of Allowance, U.S. Appl. No. 13/874,474, mailed Jun. 24, 2015.

\* cited by examiner

STREAMING CONTENT AND PLACEHOLDERS

BACKGROUND

Today, it is not uncommon for a family or even a single person to have multiple computing devices such as a desktop computer, a laptop, a smartphone, an internet-enabled television, a set top box, a gaming device, a reading tablet, and so forth. In addition, a user may have thousands of files that include pictures, audio, documents, and the like that are stored in the cloud or elsewhere. A user may want to access the files from one or more of the computing devices available to the user.

Downloading all of the user's content to each of the user's devices may not be possible as some devices may have very limited storage. Furthermore, even when a computing device has extensive storage, downloading the content to the computing device may consume considerable bandwidth, be costly, and take a long time.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to file system placeholders. In aspects, placeholders may be used by a client to represent remote file system objects. The placeholders may include metadata and may also include none, some, or all of the content of the represented remote file system objects. In response to a request to access content of a file system object represented by a placeholder, a client may obtain needed data from a remote storage system and stream or not stream the data to the requesting application based on whether the requesting application is capable of streaming the data.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
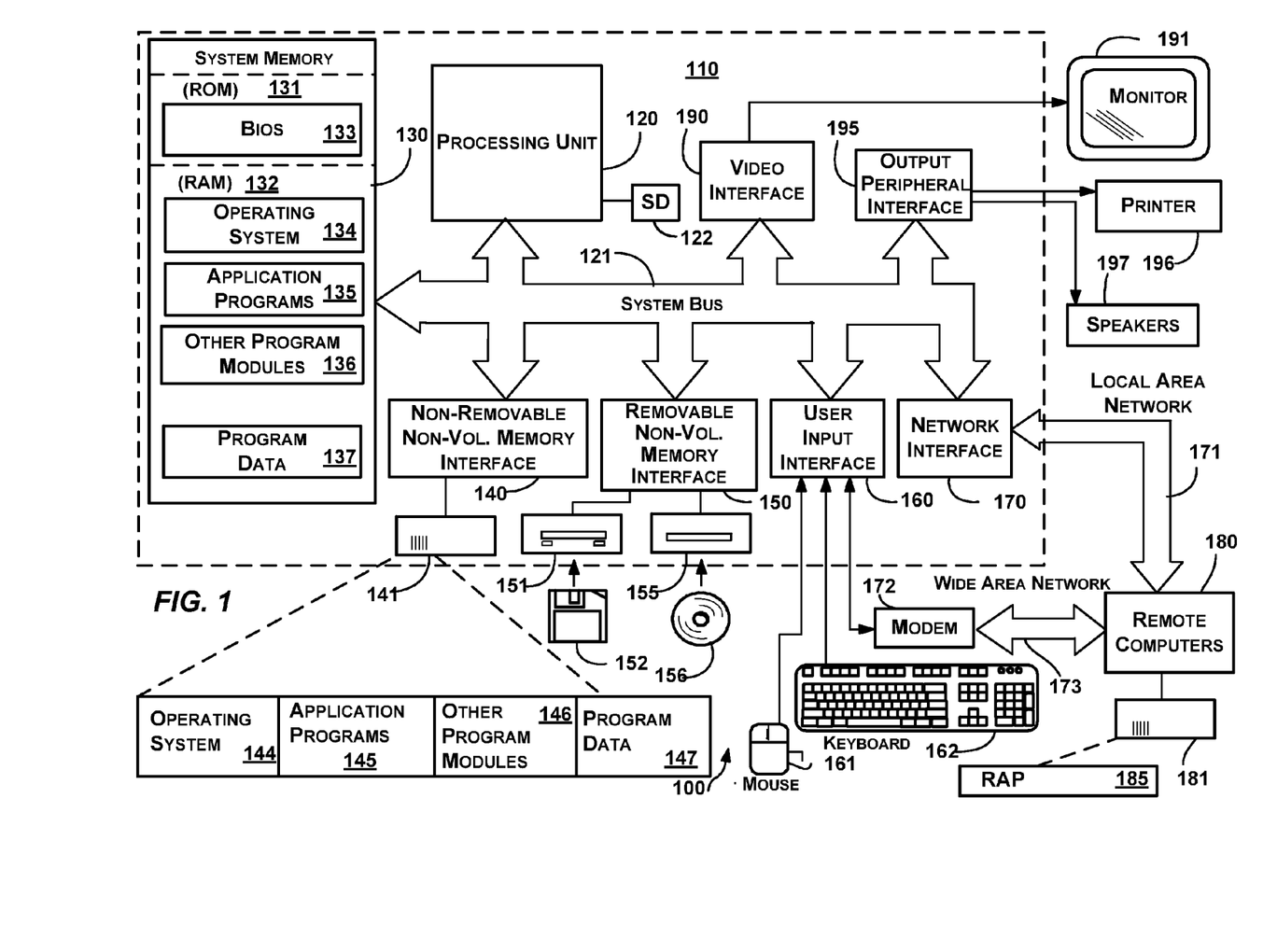
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and one or more system buses (represented by system bus 121) that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Computer storage media does not include communication media.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM, DVD, or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 120 through a user input interface 160 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include phone networks, near field networks, and other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Placeholders

In accordance with an aspect of the subject matter described herein, placeholders may be used. A placeholder may include a data structure that represents a file system object. A file system object may be a file or a directory. A directory may include zero or more files and may be a traditional file directory or some other collection or container of files. For simplicity, the term file is often used herein, but it is to be understood that the teachings herein may also be applied to directories without departing from the spirit or scope of aspects of the subject matter described herein.

A placeholder may be stored on a local storage device of a machine. In one implementation, a placeholder may indicate that content associated with the placeholder is available in a place other than a file system of the machine (hereinafter sometimes referred to as a local file system or a client file system). For example, a placeholder may indicate that content associated with the placeholder is stored in one of the cloud storage systems illustrated in FIG. 3.

In another implementation, a placeholder may indicate that the content is accessible through an application that resides on the machine. This application may store the content in memory, a local file system or a remote file system, may generate the content, may perform a combination of the above, or the like. Even if the file system could obtain the content directly, the file system may still rely on the application to access the content of the file.

In one implementation, for a placeholder where the associated content is relatively small (e.g., less than a predetermined, configurable, or calculated threshold), a copy of the entire content associated with the placeholder may also be stored in the placeholder. Storing data "in the placeholder" is meant to include storing the data in the data structure of the placeholder and/or storing the data in a local storage location indicated by the placeholder.

Depending on implementation, a placeholder may include various levels of details about a file. At a minimum, a placeholder includes data that identifies a file in a remote storage system. For example, a placeholder may indicate a specific cloud storage system at which the content may be found together with information (e.g., an identifier) that identifies the file to the cloud storage system.

A placeholder may include extrinsic metadata and/or intrinsic metadata of a file. Extrinsic metadata is any metadata that is stored outside of the content of the file. For example, extrinsic metadata may include name, size, date modified, date created, date last accessed, attributes of the file, version, other metadata maintained by the file system, and the like.

Intrinsic metadata is any metadata that is stored inside the content of the file. For example, for an audio file, intrinsic metadata may include artist name, album name, year, title of song, rating, tags, comments, genre, length, bit rate, and the like. For an image such as a camera picture, intrinsic metadata may include, for example, author, date taken, acquiring program name, dimensions, resolution, bit depth, compression, camera maker, camera model, f-stop, exposure time, other information, and the like.

The examples of intrinsic and extrinsic metadata described above are not intended to be all-inclusive or exhaustive of the types of intrinsic and extrinsic metadata. Indeed, based on the teachings herein, those skilled in the art will readily recognize other extrinsic and intrinsic metadata that may be used in accordance with the teachings herein without departing from the spirit or scope of aspects of the subject matter described herein.

In one implementation, a placeholder may include extrinsic metadata of a file such as name of the file, a size of the file, a date that the file was modified, and a date that the file was created. In another implementation, in addition to the above, a placeholder may also include attributes of the file.

In another implementation, a placeholder may include some or all of the intrinsic metadata of a file.

In one implementation, a placeholder may include some or all of the searchable text of a file. For example, a word processing document may have content that includes text and formatting. A placeholder may include the beginning N characters, words, paragraphs, pages, or the like of the text of the word processing document without the formatting, where N is predetermined, configurable, or determined on the fly.

In one implementation, a placeholder may include an indication of the language(s) of the searchable text. For example, a placeholder may include data that indicates that the searchable text is written in English. As another example, a placeholder may include data (e.g., a tag or other data) that indicates that a portion of the text is written in English and data (e.g., another tag or other data) that indicates that another portion of the text is written in Spanish.

As another example, a presentation program may have relatively little text compared to other data used for a presentation. In this example, a placeholder may include all the text of the presentation while omitting other data used for the presentation.

In one implementation, a placeholder may include a thumbnail of an image. The image may be included in the content of the file associated with the placeholder while the thumbnail may be generated from the image or also included in the content of the file. In one embodiment, the thumbnail included in the placeholder may be of a relatively small size that may be predefined, configurable, or determined on the fly.

In one implementation, a placeholder may include data that identifies how to obtain larger thumbnails of the content associated with the placeholder. For example, a placeholder may include an address of a service from which a larger thumbnail of a file may be requested. The service may be able to accept input that indicates the size of the thumbnail that is to be provided.

Likewise, in one implementation, a placeholder may include a lower fidelity sample (or data that identifies how to obtain such as sample) of content of a file associated with the placeholder. For example, a placeholder may include a lower fidelity sample (or link to a service) of a music, video, or other type of file.

In one implementation, a placeholder may include a data structure (e.g., a bitmap, linked list, or other data structure) that indicates which portions of the associated content are located on the local file system. This data structure may be consulted when a program seeks to access the content. If the data structure indicates that the requested content is available locally, the requested content may be obtained from local storage. If not, other actions may be taken to obtain the requested content from remote storage prior to providing the program with the content.

In one implementation, a placeholder may have a flag that indicates whether the content of the file is to be made available when offline. As indicated previously, a client may periodically lose connectivity to remote storage upon which content associated with a placeholder is found. If the flag is set, when the client is online, content for the placeholder may be downloaded to local storage and be maintained there so that the content is available even when the remote storage is unavailable.

Various embodiments may have placeholders that include any one or more of the data indicated above.

A placeholder may be used to give the illusion that a file resides on a local file system even when the content of the file resides remotely. This illusion may be maintained even when the remote file system is not reachable. This may be done by inserting the placeholder into a namespace of a local file system. The file system may be modified to recognize placeholders and to display information about a file represented by the placeholder as appropriate. For example, the file system may display the names and relevant metadata for a placeholder when a user navigates through the namespace of the local file system.

Placeholders may be used to vastly reduce the amount of storage space consumed. For example, instead of storing the content for large videos locally, placeholders may be used to indicate that the videos are available. Because the placeholders may use a much smaller amount of space than the actual content of the video, even a relatively small local storage device may include placeholders for a vast collection of files that include a significant amount of content.

Placeholders may be used when a remote storage system is unavailable. For example, when network connectivity is lost or not available, a machine may use locally stored placeholders to navigate and perform other operations on the namespace of a file system.

A placeholder is persisted even when the client machine is shutdown. Thus, the placeholder is still available when the client machine is restarted. This persistence behavior may be implemented by storing the placeholder on a local storage of the client.

Figure 2:
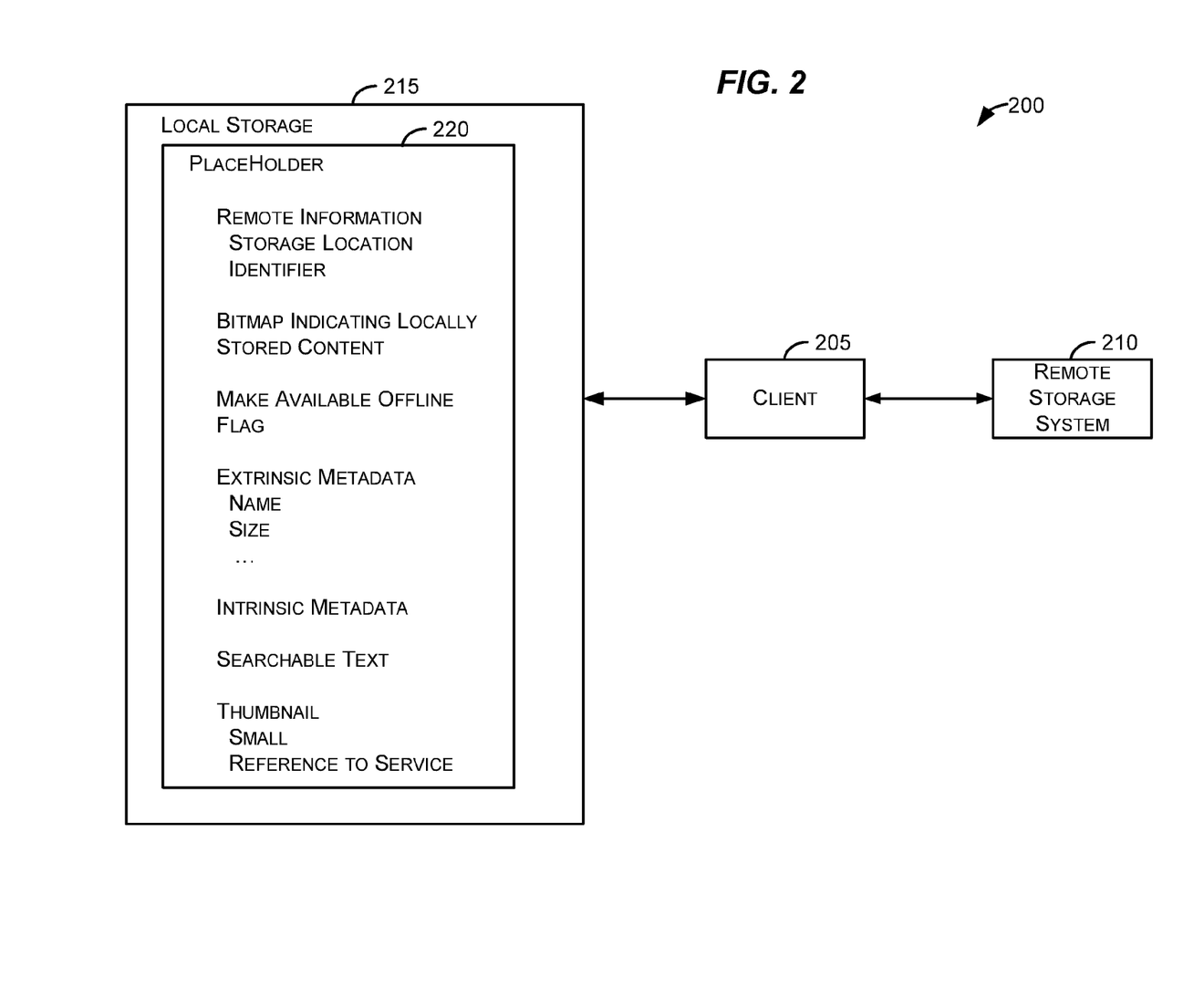
FIGS. 2-3 are block diagrams that generally represents exemplary components of systems configured to use placeholders in accordance with aspects of the subject matter described herein.
Figure 3:
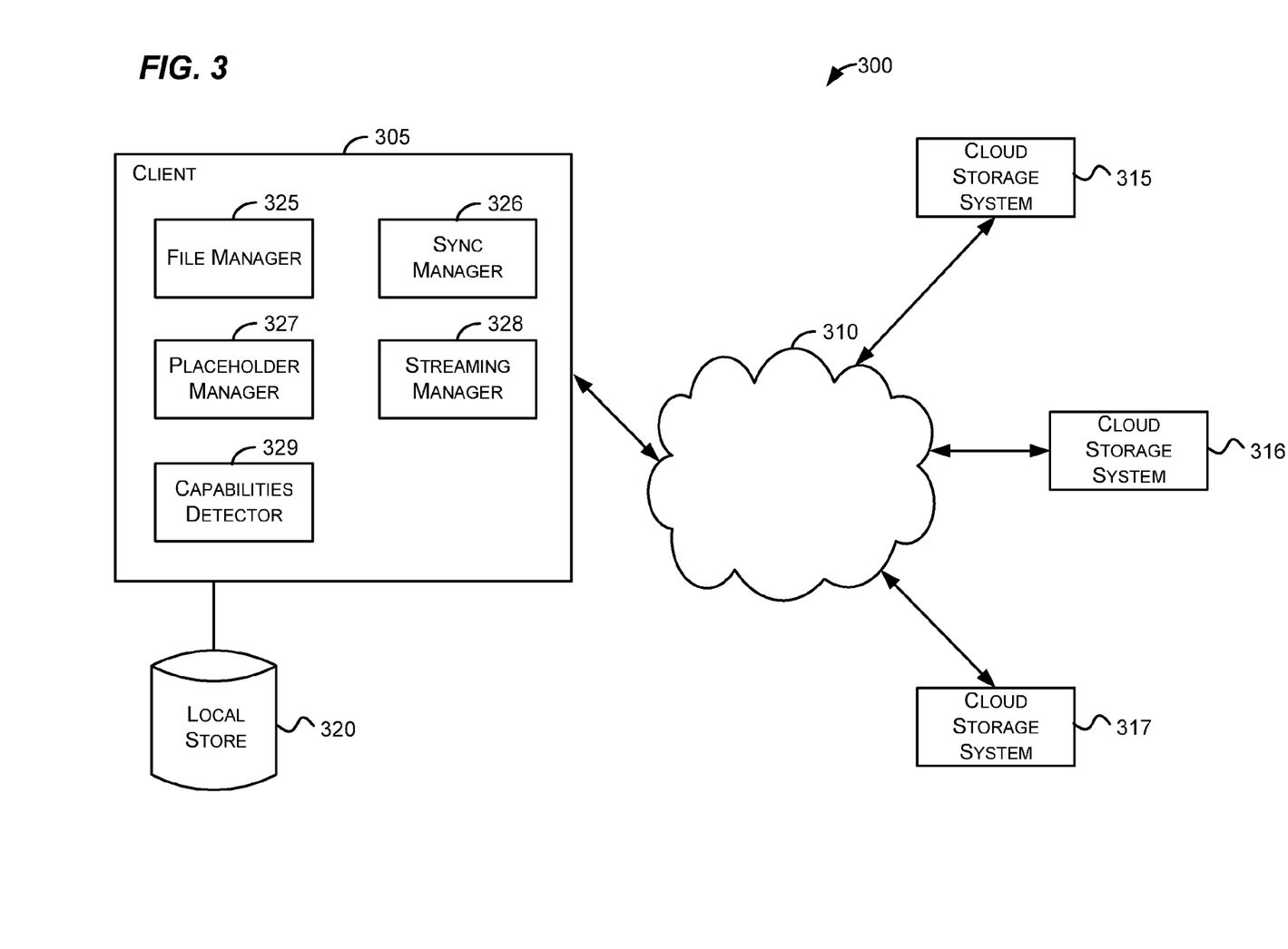

FIGS. 2-3 are block diagrams that generally represent exemplary components of systems configured to use placeholders in accordance with aspects of the subject matter described herein. The components illustrated in FIGS. 2-3 are exemplary and are not meant to be all-inclusive of components that may be needed or included. Furthermore, the number of components may differ in other embodiments without departing from the spirit or scope of aspects of the subject matter described herein. In some embodiments, the components described in conjunction with FIGS. 2-3 may be included in other components (shown or not shown) or placed in subcomponents without departing from the spirit or scope of aspects of the subject matter described herein. In some embodiments, the components and/or functions described in conjunction with FIGS. 2-3 may be distributed across multiple devices.

As used herein, the term component is to be read to include hardware such as all or a portion of a device, a collection of one or more software modules or portions thereof, some combination of one or more software modules or portions thereof and one or more devices or portions thereof, and the like.

For example, the components illustrated in FIGS. 2-3 may be implemented using one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

An exemplary device that may be configured to implement one or more of the components of FIGS. 2-3 comprises the computer 110 of FIG. 1.

A component may also include or be represented by code. Code includes instructions that indicate actions a computer is to take. Code may also include information other than actions the computer is to take such as data, resources, variables, definitions, relationships, associations, and the like.

Code may be executed by a computer. When code is executed by a computer, this may be called a process. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. Code may execute in user mode, kernel mode, some other mode, a combination of the above, or the like.

Turning to FIG. 2, the system 200 may include a client 205, a remote storage system 210, local storage 215, a placeholder 220, and may include other components (not shown). The client 205 may have direct access to the local storage 215 and be connected to the remote storage system 210 through the use of a cloud network.

Although the terms "client" and "server" are sometimes used herein, it is to be understood, that a client may be implemented on a machine that has hardware and/or software that is typically associated with a server and that likewise, a server may be implemented on a machine that has hardware and/or software that is typically associated with a desktop, personal, or mobile computer. Furthermore, a client may at times act as a server and vice versa. At times, two or more entities that more frequently act as a client or server may concurrently be peers, servers, or clients. In an embodiment, a client and server may be implemented on the same physical machine.

Furthermore, as used herein, each of the terms "server" and "client" may refer to one or more physical or virtual entities, one or more processes executing on one or more physical or virtual entities, and the like. Thus, a server may include an actual physical node upon which one or more processes execute, a virtual node upon which one or more processes execute, a service executing on one or more nodes, a group of nodes that together provide a service, and the like. A service may include one or more processes executing on one or more physical or virtual entities. Furthermore, a single process may implement one or more servers.

The local storage 215 may include any storage media capable of storing data. For example, the local storage 215 may include volatile memory (e.g., a cache) and non-volatile memory (e.g., a persistent storage). The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The local storage 215 may be external, internal, or include some components that are internal and some components that are external to the client 205. In one implementation, the local storage 215 may include any storage that is housed in a machine hosting the client 205. In another implementation, the local storage 215 may include storage that is directly connected to the machine hosting the client 205. For example, the local storage 215 may be connected to the machine via a USB link, an IEEE 1394 link, an optical link, another hardwired link, or the like.

The remote storage system 210 may include one or more computers that are arranged to store and provide access to data. Access as used herein may include reading data, writing data, deleting data, updating data, a combination including two or more of the above, and the like. The remote storage system 210 may be connected to the client 205 via a network such as the cloud. The cloud is a term that is often used as a metaphor for the Internet. It draws on the idea that computation, software, data access, storage, and other resources may be provided by entities connected to the Internet without requiring users to know the location or other details about the computing infrastructure that delivers those resources.

In one example, the remote storage system 210 may comprise a data center where the computing devices are located in a single physical location. In another example, the remote storage system 210 may include computing devices and storage that are attached to the cloud at different locations. In one example, the remote storage system 210 may comprise a single server or other computing device that provides access to one or more storage devices. In one example, the remote storage system 210 may comprise a computing device that is not on the client 205's local area network (LAN). In another example, the remote storage system 210 may comprise any storage that is not housed in or directly connected to the client 205. In another example, the remote storage system 210 may include storage that is not available to the client 205 when the client is not connected to a network from which the storage is accessible.

Sometimes the term cloud storage system is used herein. This is not intended to be limiting with respect to remote storage systems to which the teachings herein may be applied but to provide an example of a remote storage system that may be used without departing from the spirit or scope of aspects of the subject matter described herein. Whenever the term cloud storage system is used herein, it is to be understood that in other embodiments, other types of remote storage systems may be used without departing from the spirit or scope of aspects of the subject matter described herein.

While the local storage 215 may be almost continuously available to the client 205 or may be readily made available by means available to the user (e.g., by plugging in a connector) the remote storage system 210 may, at times, become unavailable to the client 205. For example, if the client 205 is hosted on a laptop, the laptop may be moved to a location that does not have Internet access. As another example, network outages may disrupt the connectivity of the client 205 to the remote storage system 210. As another example, the remote storage system 210 may become inoperative or may be shut down or disconnected for maintenance or other purposes. Without placeholders, when connectivity with the remote storage system 210 is lost, the client 205 may not be able to navigate the namespace or perform operations on a file where the entire file content is not available on the local storage 215.

The placeholder 220 illustrates various exemplary data fields that may be stored in a placeholder stored on the local storage 215. Although only one placeholder is shown in FIG. 2, more often, there will be multiple placeholders stored on the local storage 215. For example, for a given namespace, there may be one placeholder for each remote file system object if the content of the remote file system object does not completely exist on the local storage 215. As another example, for the given namespace, there may also be placeholders for remote file system objects even when the entire content of the remote file system objects exists on the local storage 215. This second set of placeholders may also be stored on the local storage 215 for files having content with a size less than a given threshold as mentioned previously.

A namespace may include an identifier (e.g., name or other identifier) for each file of a file system together with hierarchy information regarding the file. For example, a namespace may include a namespace entry corresponding to D:\DIR1\FILE1.TXT. This namespace entry indicates the name of a file (e.g., FILE1.TXT) and indicates that the file exists in a directory (e.g., DIR1). A namespace may also include other metadata. A namespace may have a one-to-one or some other mapping with file system information and may represent virtual folder hierarchies.

Streaming

As mentioned previously, there may be various reasons to avoid storing all files of a user on each device of the user. With the use of placeholders, a file may be completely hydrated, partially hydrated, or dehydrated. When an application on a client requests content of a file that does not exist on the client file system, the content may be obtained from a cloud storage system.

To completely hydrate a file, in one implementation, content of the file represented by a placeholder may be downloaded and stored on the client file system. The entire content of a file may be downloaded in a single download or may be streamed to the client 305 as described in more detail below. Upon being completely hydrated, in one implementation, the placeholder may be purged from the local file system and replaced with regular file system metadata. In another implementation, even though the contents and metadata of a file are stored on the client file system, the placeholder may remain and be used in conjunction with or instead of the regular file system metadata maintained for the file.

When a file is partially hydrated, this indicates that at least a portion of the content of the file represented by a placeholder is stored on the client file system. As indicated earlier, a data structure of the placeholder may indicate which portions of the file are stored on the client file system and which portions of the file are not stored on the client file system. In one implementation, at least as long as a file is partially hydrated, a corresponding placeholder remains on the client file system.

When a file is dehydrated, other than intrinsic metadata, if any, included in the content (and stored in the placeholder), the content of the file is not stored on the client file system.

Turning to FIG. 3, the system 300 may include a client 305, a cloud 310, cloud storage systems 315-317, a local store 320, and other components (not shown). The client 305 may include a file manager 325, a synchronization manager 326, a placeholder manager 327, a streaming manager 328, a capabilities detector 329, and other components (not shown).

The components of FIG. 3 may be implemented using the hardware and/or software of one or more computing devices as described previously. The storage device(s) that implement the local store 320 may be implemented in a similar manner as the local storage 215 of FIG. 2 and may be external, internal, or include some components that are internal and some components that are external to the client 305.

The local store 320 may have computer storage elements that persist (e.g., store in non-volatile storage) file system metadata for local file system objects of a local file system of the client and that persist placeholders for remote file system objects of a cloud storage system. As mentioned previously, the placeholders may include metadata of the remote file system objects without requiring that content of the remote file system objects exist in the local store 320.

The metadata included in placeholders stored in the local store 320 may be sufficient to allow the client 305, while offline with respect to a cloud storage system, to obtain namespace information from the placeholders. In one implementation, at a minimum, sufficient metadata may include a name of the file system object. For example, with the name of the file system object and hierarchy information maintained in the file system, a user may navigate a namespace of the client file system even when the client is offline with respect to a cloud storage system. In other implementations, the metadata included in the placeholders may also include other metadata, intrinsic or extrinsic, of file system objects.

The file manager 325 may be structured to create, via the file system metadata and the placeholders, a namespace that includes the local file system objects and the remote file system objects. The file manager 325 may be further structured to provide, via an interface, metadata for the local file system objects and the remote file system objects regardless of whether connectivity exists to a cloud storage system.

In absence of connectivity to a cloud storage system, the file manager 325 may still allow operations to proceed on both files that reside locally and files represented by placeholders. For example, the file manager may update a file system data structure of the local file system to indicate an operation performed on a file system object represented by a placeholder even when the content of the file system object does not reside completely on the local store. As another example, the file manager 325 may update a namespace to reflect an operation such as a rename, move, delete, restore, create, copy operation, or the like.

The synchronization manager 326 may be structured (e.g., include hardware and/or software) to discover changes (e.g., content changes, metadata changes including intrinsic, extrinsic, and namespace changes, other changes, and the like) that occurred to file system objects in the absence of connectivity to the cloud storage system and, when connectivity is re-established with the cloud storage system, to synchronize the changes with the cloud storage system.

In different implementations, the synchronization manager 326 may use various methods for discovering changes. For example, in one implementation, the synchronization manager 326 may discover changes by examining an operations log that stores operations that occur on file system objects. As another example, in another implementation, the synchronization manager 326 may discover changes by comparing a state of file system and file system objects prior to the changes with a state of the file system and file system objects after the changes.

The placeholder manager 327 may be structured to create, populate, and maintain the placeholders to ensure that a placeholder exists for each remote file system object in the namespace at least if the content of the remote file system object does not completely exist on the local store 320. As mentioned previously, a placeholder may also be maintained on the local file system when the content of the remote file system object does completely exist on the local store 320.

The streaming manager 328 and/or other components of the client 305 may be structured to perform streaming actions for content requested by applications hosted on the client 305. Some exemplary actions include:

1. Receiving a request to access content of a file. For example, in navigating a file system namespace using a navigation application that presents a graphical user interface, a user may select a file and request the file to be opened. In response, the navigation application may inform the streaming manager 328 and indicate another application that will attempt to open the file.

The request to access content of a file may be accompanied by a version of the file that is requested. For example, in some cases, it may be desirable to obtain a version other than the most up-to-date version. In those cases, the client 305 may receive a request for a specific version of a file that is represented by a placeholder.

2. Determining, based on the placeholder, whether the content resides on the local file system. As indicated previously, the placeholder may include a data structure that indicates what content of a file is stored on the local file system. When an application requests content of a file, the application may request a range of data within the file. The data structure may be used to determine if the range of data is stored on the local file system.

3. If the content resides (e.g., is stored on) on the local file system, determining whether the content is up-to-date. When files are synchronized between clients and a cloud storage system, one client may update a file on the cloud storage system while other clients may not be aware of this update until later. To determine whether content is up-to-date, in one implementation, a version for the file on the client may be compared with a version in the cloud storage system. The version on the client may be stored in a placeholder. If the content resides on the local file system and is up-to-date, the content may be provided from the local file system to the requesting application. Otherwise, if the content is not up-to-date, updated content may be downloaded from the cloud storage system prior to providing the content to the requesting application.

4. If the content does not reside on the local file system, determining whether the application to which content is to be provided is structured to access the content via streaming or not. Some applications may be structured to access files via a streaming interface. For example, these applications may be implemented to read and write file content through a streaming object.

Other applications, however, may not be structured to access files via a streaming interface. For example, these other applications may have been coded prior to the availability of a streaming interface. They may have been coded to access a non-streaming interface of the file system that relies on content of the file being available locally. Such applications are sometimes referred to as legacy applications.

Determining whether an application is structured to access content via streaming may be performed in various ways. In one implementation, whether an application is structured to access content via streaming may be determined by accessing a data structure (e.g., such as a database) of the client that includes this information. For example, during installation of an application or at another time, a database may be updated to indicate whether the application is structured to access content via streaming.

Another mechanism for determining whether an application is structured to access content via streaming includes determining which interface the application has called. If the application has called an interface that is compatible with streaming the content, the application may be determined to be structured to access content via streaming. If the application has called an interface that is not compatible with streaming the content, the application may be determined to be not structured to access content via streaming. This mechanism may be used, for example, when the application attempts to open a file rather than when the application is launched (e.g., by a navigation application) and instructed to use the file. In the latter case, an error may occur if the application attempts to access content of the file via legacy mechanisms and the content is not available locally.

In another implementation, the application may be determined to be a legacy application by other information (e.g., by date of installation, version number, identifier, other data, or the like) provided that there are no other indications that the application is structured to access content via streaming. Other indications may include, for example, a data structure stored on the client or whether the application has called a streaming interface as described previously, or the like. Based on date of installation, version number, or other data, an application may be considered an older application that would not typically be capable of accessing content via streaming. If there are no other indications that the application is capable of accessing content via streaming, the application may be determined to be a legacy application. If, on the other hand, other information indicates that the application is structured to access content via streaming, the application may be classified as a streaming application even though the application may be older, for example.

In one implementation, determining whether an application is structured to access content via streaming may be done by a component of the client 305. One exemplary component that may do this is the capabilities detector 329. In other embodiments, this functionality may be included in one of the other components of the client 305.

The examples given above of determining whether an application is structured to access content via streaming are not intended to be all-inclusive or exhaustive. Based on the teachings herein, those skilled in the art may recognize other mechanisms that may be used for this purpose without departing from the spirit or scope of aspects of the subject matter described herein.

5. If the application is structured to access content via streaming, actions including the following may be performed:

A. Obtaining at least a portion of the file from the cloud storage system. The portion obtained includes at least as much as the content requested and may include more content than was requested or even enough of the content of the file to ensure that all of the content of the file is available locally.

The type of the file is one factor that may be used to determine how much of the file to download in response to the request for content. For example, a file may include a video, an image, a word processing or other document, compressed data, a database, other data, or the like. A file may be associated with data (e.g., metadata) that indicates the content type(s) of the file.

The streaming manager 328 may download different amounts of the content of the file depending on type. For example, if the file is an image type, and content of the file is requested, the streaming manager 328 may download all content of the file that is not available locally. In one implementation, this may be done prior to providing content to the requesting application to the content of the file.

As another example, the file may be a compressed file that includes one or more other files. In some implementations, an included compressed file may not be able to be decompressed unless all the data representing the compressed file is available. In this case, if a request is received to access any portion of a compressed file that is within the file, the streaming manager 328 may download all the data of the compressed file prior to providing the content to the requesting application.

As another example, if the file is a video type, in response to a request for content, the streaming manager 328 may download a calculated amount of playback data of the file. The calculated amount may be, for example, based on a bitrate and a period of time. The bitrate and the period may be used to determine how needed for the period of playback. The bitrate may be included in the placeholder.

In addition, the amount of data obtained from the cloud storage system may depend on access patterns with respect to the file. For example, after an application has requested N small sequential portions of a file, the streaming manager 238 may increase the size of the chunks of data obtained amount of data obtained from the cloud storage system in anticipation of receiving additional sequential reads.

B. Updating the placeholder. The placeholder may be updated to indicate that the content is available from the local file system. This may involve, for example, updating a data structure to indicate what portions of the file reside on the local file system. In one implementation, if all of the contents of the file reside on the local file system, the placeholder may be deleted and replaced with regular file system metadata.

C. Providing the content to the application. After the content has been downloaded from the cloud storage system, the content may be provided to the application.

6. If the application is not structured to access content via streaming, the streaming manager may ensure that all of the content is available from the local file system prior to providing the content to the application.

An application may open a file represented by a placeholder and close the file prior to all the content of the file being downloaded to the local store 320. After the application closes the file, the client 305 may, based on policy, proactively mark the file as available offline. Marking the file as available offline may cause the synchronization manager 326 to, when possible, proactively download the file and make it locally available. Some exemplary policies include:

1. A policy may indicate that a file that an application opens and then closes is to be fully downloaded even if the file is not fully read.

2. A policy may indicate that certain file types are to be fully downloaded once they have been opened and closed, but that certain other file types are not to be fully downloaded. For example, documents may be fully downloaded while videos are not.

3. A policy may indicate that files smaller than a configurable size are to be fully downloaded once they have been opened and closed, but that files larger than the threshold size are not to be fully downloaded.

4. A policy may allow an application to indicate whether to make a file available offline (e.g., via an API parameter). In one implementation, the client 305 may override other policies based on the application indication. In another implementation, the client 305 may use the indication as a hint as to whether to make the file available offline.

The cloud storage systems 315-317 may include one or more storage devices together with one or more computing devices that provide access to those storage devices. In one embodiment, a cloud storage system may comprise a data center where the computing devices are located in a single physical location. In another embodiment, a cloud storage system may include computing devices and storage that are attached to the cloud at different locations. In one embodiment, a cloud storage system may comprise a single server that provides access to one or more storage devices. In one embodiment, a cloud storage system may comprise a computing device that is not on the client's local area network (LAN). In another embodiment, a cloud storage system may comprise any storage that is not housed in or directly connected to the client.

Although three cloud storage systems are shown in FIG. 2, in other implementations, there may be any number of cloud storage systems.

Figure 4:
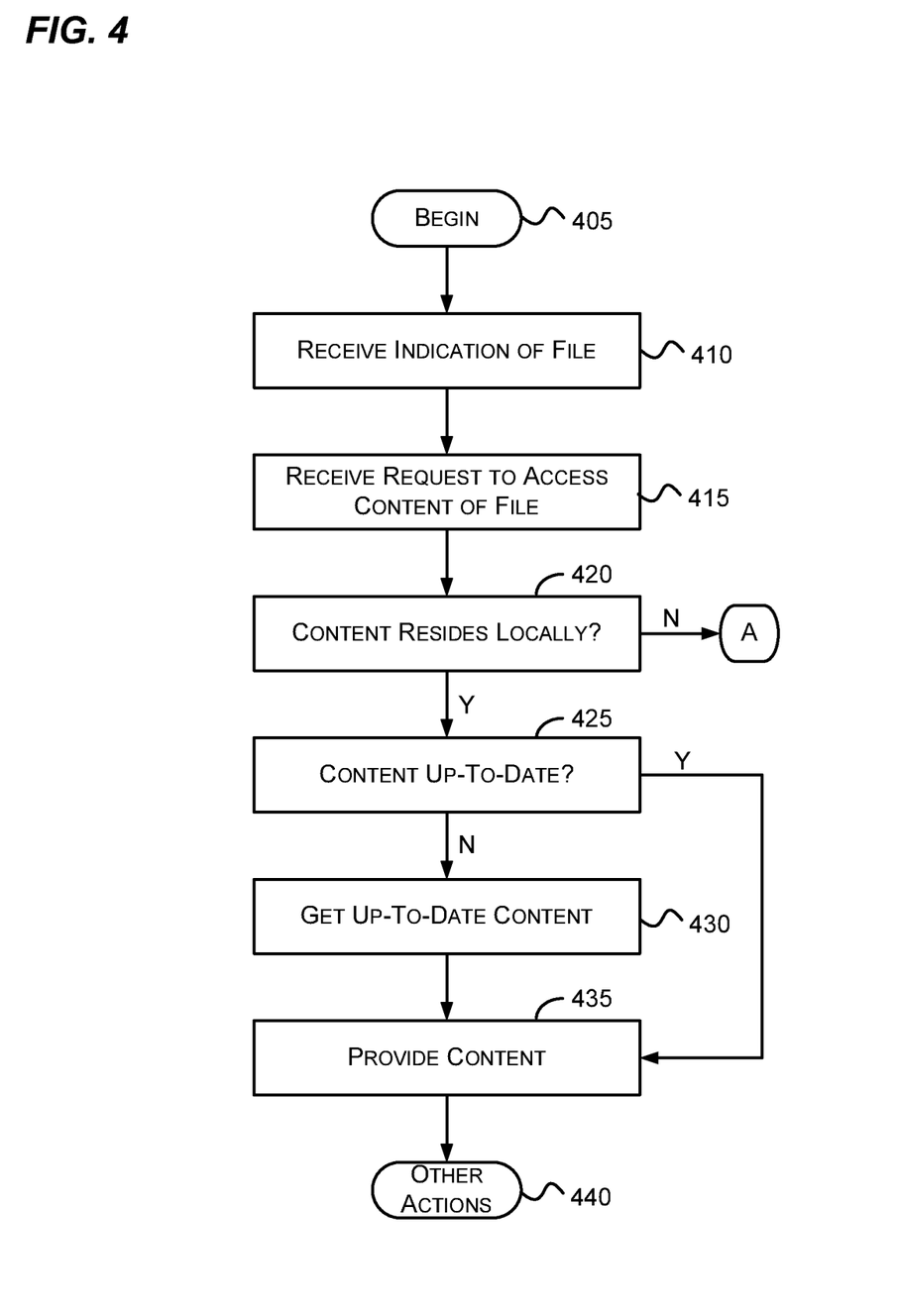
FIGS. 4-5 are flow diagram that generally represents exemplary actions that may occur from a client perspective in accordance with aspects of the subject matter described herein.
Figure 5:
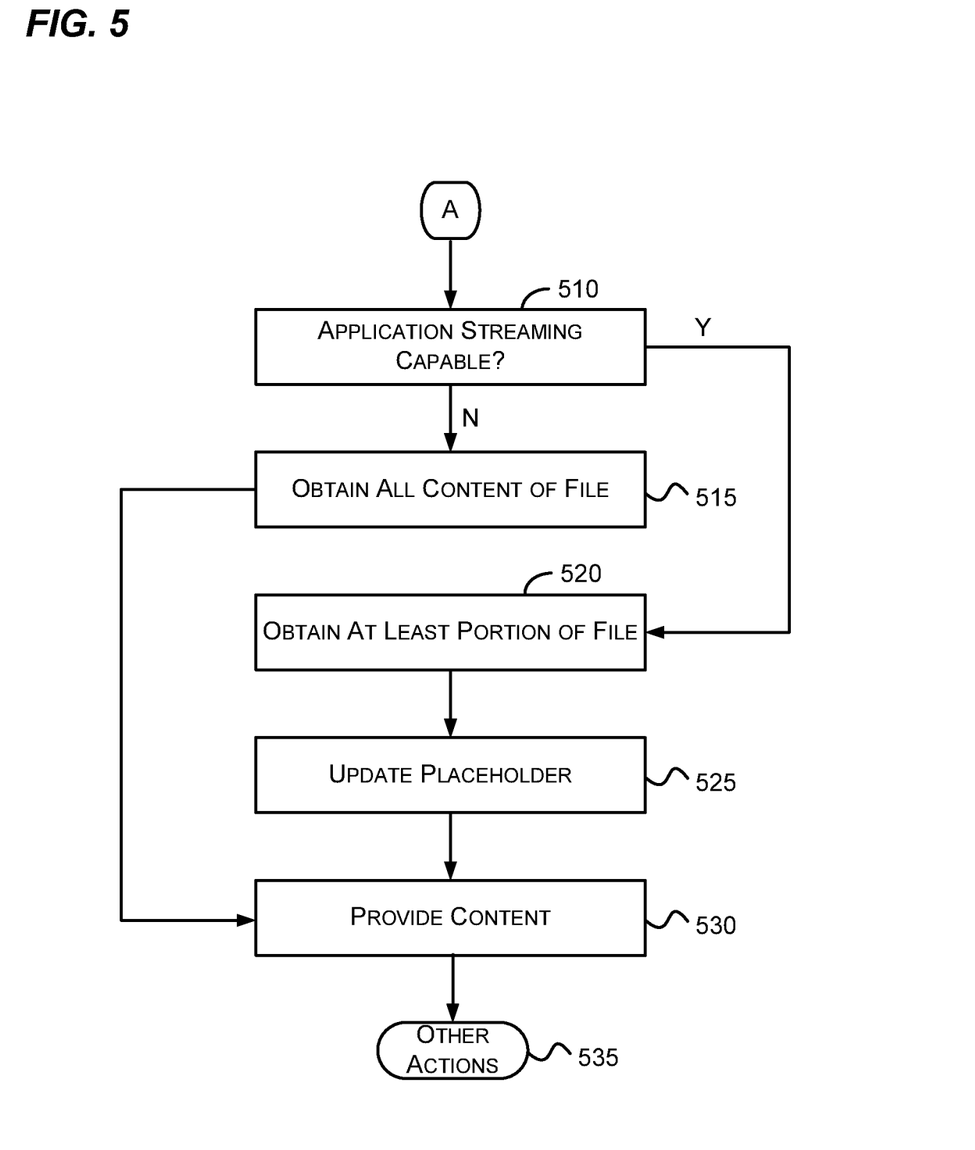
Figure 6:
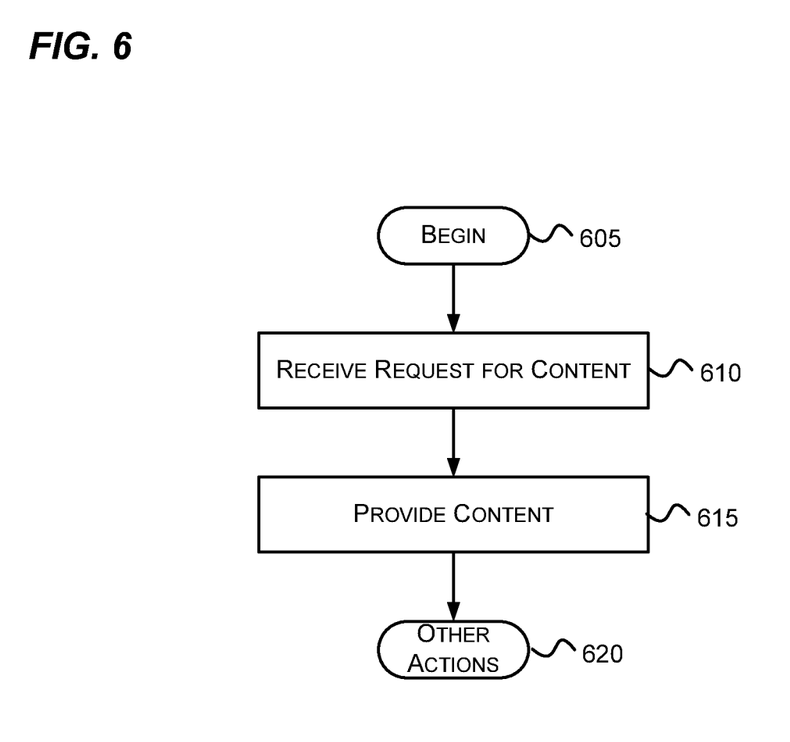
FIG. 6 is a flow diagram that generally represents exemplary actions that may occur from a cloud storage system perspective in accordance with aspects of the subject matter described herein.

FIGS. 4-6 are flow diagrams that generally represent exemplary actions that may occur in accordance with aspects of the subject matter described herein. For simplicity of explanation, the methodology described in conjunction with FIGS. 4-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, two or more of the acts may occur in parallel or in another order. In other embodiments, one or more of the actions may occur with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIGS. 4-5 are flow diagram that generally represents exemplary actions that may occur from a client perspective in accordance with aspects of the subject matter described herein. Turning to FIG. 4, at block 405, the actions begin.

At block 410, an indication is received of a file of a local file system of a client. For example, referring to FIG. 3, the streaming manager 328 may receive an indication of a file from the file manager 325 or another component.

At block 415, a request is received to access content of the file. For example, referring to FIG. 3, the streaming manager 328 receives a request to read data within a range of the file. In one embodiment, the actions of block 410 and block 415 may occur in a single event. For example, an indication of the file and a request to read data of the file may be received in a single request (e.g., as parameters of the request).

At block 420, a determination is made, based on a placeholder, whether the requested content resides on the local file system. If so, the actions continue at block 425; otherwise, the actions continue at block 510 of FIG. 5. For example, referring to FIG. 3, the streaming manager 328 may consult a data structure in the placeholder to determine whether the requested content resides on the local store 320.

At block 425, if the content is up-to-date, the actions continue at block 435; otherwise, the actions continue at block 430. For example, referring to FIG. 3, the streaming manager 328 may determine whether the requested content is up-to-date by the mechanisms described previously.

At block 430, up-to-date content is obtained. For example, referring to FIG. 3, the streaming manager 328 may obtain updated content from the cloud storage system (e.g., one of the cloud storage systems 315-317) indicated by the placeholder.

At block 435, the content is provided to the requesting application. For example, referring to FIG. 3, the up-to-date content that is on the local store 320 may be provided to an application that has requested the content.

At block 440, other actions may occur. Other actions may include, for example, actions mentioned in conjunction with FIG. 3 or elsewhere herein.

Turning to FIG. 5, at block 510, a determination is made as to whether an application to which the content is to be provided is structured to access the content via streaming. If so, the actions continue at block 520; otherwise, the actions continue at block 530. For example, referring to FIG. 3, the streaming manager 328 may determine whether an application (not shown) is coded to access the content via streaming.

At block 515, if the application is not structured to access the content via streaming, all of the content of the file that does not reside locally may be downloaded from a cloud storage system. For example, referring to FIG. 3, the streaming manager 328 may use a placeholder to determine what portions of the file do not reside on the local storage and may download those portions from the appropriate cloud storage system.

At block 520, at least a portion of the file is obtained from the cloud storage system. For example, referring to FIG. 3, the streaming manager 328 may a portion (or all) of the file from the appropriate cloud storage system.

At block 525, the placeholder is updated to indicate that the content is available from the local file system. For example, referring to FIG. 3, a component of the client 305 may update a placeholder to indicate what portions of the file are available on the client.

At block 530, the content is provided to the application. For example, referring to FIG. 3, the content may be provided to a requesting application (not shown).

At block 535, other actions may occur. Other actions may include, for example, actions mentioned in conjunction with FIG. 3 or elsewhere herein.

FIG. 6 is a flow diagram that generally represents exemplary actions that may occur from a cloud storage system perspective in accordance with aspects of the subject matter described herein. At block 605, the actions begin At block 610, a request for content is received. For example, referring to FIG. 3, the cloud storage system 315 may, from the client 305, receive a request for content for a file. This request may be received, for example, when the client 305 is attempting to stream data or obtain all the data for the file.

At block 615, the content is provided. For example, referring to FIG. 3, the cloud storage system 315 may provide the requested content to the client 305.

At block 620, other actions may occur.

As can be seen from the foregoing detailed description, aspects have been described related to file system placeholders. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   receiving an indication of a file system object of a local file system of a client, the file system object comprising a placeholder representing the file system object on the local file system, a remote file at a remote storage system, and portions of content, the placeholder being stored on the local file system, the client structured to obtain metadata of the file system object from the placeholder, the client structured to synchronize the local file system with the remote storage system, including duplicating portions of the content from the remote file to the local file system and from the local file system to the remote file, the metadata sufficient to allow the client, while offline with respect to the remote storage system, to obtain namespace information about the file system object from the placeholder, the placeholder including data that identifies the remote storage system from which data of the file system object is obtainable;
   receiving a request to access at least a portion of the content of the file system object;
   determining, based on the placeholder, whether the portion of the content resides on the local file system;
   providing first code that is configured to be executed responsive to determining that the portion of the content resides on the local file system, the first logic able to determine whether the portion of the content is up-to-date and, if so, provide the portion of the content from the local file system;
   providing second code that is configured to be executed responsive to determining that the portion of the content does not reside on the local file system, the second logic configured to determine whether or not an application to which the portion of the content is to be provided is structured to access the portion of the content via streaming by accessing a data structure stored on the local file system, the data structure indicating whether the application is structured to access the content via streaming;
   providing third code that is configured to be executed responsive to determining that the application to which the portion of the content is to be provided is structured to access the content via streaming, the third code configured to perform actions comprising:
      obtaining the portion of the content of the file system object from the remote storage system,
      updating the placeholder to indicate that the content is available from the local file system, and
      providing the content to the application.

2. The method of claim 1, wherein the data structure indicates which portions of the file system object reside on the local file system.

3. The method of claim 1, wherein determining whether the content is up-to-date comprises comparing a local version of the file system object with a remote version of the file system object, the local version stored in the placeholder, the remote version stored on the remote storage system.

4. The method of claim 1, the data structure having been created or updated in conjunction with installing the application.

5. The method of claim 1, wherein determining whether the application to which the content is to be provided is structured to access the content via streaming comprises determining that the application is not structured to access the content via streaming if the application is a legacy application.

6. The method of claim 1, wherein determining whether the application to which the content is to be provided is structured to access the content via streaming further comprises receiving a call from the application, the call directed to an interface that is compatible with streaming the content, the file system having at least two interfaces for accessing the content, one of the two interface being compatible with streaming the content, another of the two interfaces not being compatible with streaming the content.

7. The method of claim 1, wherein obtaining at least a portion of the file system object is based on a type associated with the file system object.

8. The method of claim 7, wherein obtaining the at least a portion based on a type associated with the file system object comprises obtaining all the content of the file system object before providing access to the content of the file if the type is an image type.

9. The method of claim 7, wherein obtaining the at least a portion based on a type associated with the file system object comprises obtaining all data of a compressed file that is within the file system object if the file system object is compressed and the request is to access any portion of the compressed file.

10. The method of claim 1, wherein obtaining at least a portion of the file system object comprises obtaining a calculated amount of playback data of the file system object, the calculated amount of playback data based on a bitrate of the file system object, the bitrate included in the placeholder.

11. A computing device, comprising:
processing hardware;
storage hardware comprising computer storage elements that persist file system metadata for local file system objects of a local file system and that persist placeholders for remote file system objects of a remote storage system, the placeholders including metadata of the remote file system objects without requiring that the remote file system objects exist in the storage hardware;
the storage hardware storing a placeholder manager structured to be executed by the processing hardware to create, populate, and maintain the placeholders to ensure that placeholders exist for the respective remote file system objects in a namespace, wherein at least some of the placeholders represent respective remote file system objects for which there is no content thereof stored on the storage hardware; and
the storage hardware storing a streaming manager, hosted on the computing device, the streaming manager structured to be executed by the processing hardware to perform actions, the actions comprising:
receiving a request from an application to access content of a file system object;
determining, based on a placeholder of the file, whether the content resides on the local file system;
providing first code that is configured to be executed by the processing hardware responsive to determining that the content resides on the local file system, the first code configured to determine whether the content is up-to-date and, if so, provide the content from the local file system;
providing second code that is configured to be executed by the processing hardware responsive to determining that the content does not reside on the local file system, the second code configured to determine whether an application to which the content is to be provided is structured to access the content via streaming or whether the application to which content is to be provided is not structured to access the content via streaming; and
providing third code that is configured to be executed by the processing hardware responsive to determining that the application to which the content is to be provided is structured to access the content via streaming, wherein the whether the application is structured to access the content via streaming is determined according to how the application makes the request for the content of the file, the third code configured to perform actions comprising:
obtaining at least a portion of the content of the file system object from the remote storage system,
updating the placeholder to indicate that the obtained portion of the content is available from the local file system, and
providing the obtained portion of the content to the application while continuing to obtain additional content of the file system object from the remote file system object.

12. The computing device of claim 11, further comprising a capabilities detector stored in the storage hardware and structured to be executed by the processing hardware to determine whether the application to which the content is to be provided is structured to access the content via streaming.

13. The computing device of claim 12, wherein the capabilities detector being structured to further determine whether the application to which the content is to be provided is structured to access the content via streaming by accessing a data structure stored on the local file system, the data structure having been created in conjunction with installing or updating the application, the data structure indicating whether the application is structured to access the content via streaming.

14. The computing device of claim 11, wherein the file system comprises at least two interfaces for accessing the content, one of the two interface being compatible with streaming the content, another of the two interfaces not being compatible with streaming the content, and wherein which interface the application used to request the content serves as the basis for determining whether the application is structured to access the content via streaming.

15. The computing device of claim 11, wherein the streaming manager is further structured to determine the at least a portion to obtain based on a type associated with the file system object.

16. The computing device of claim 15, wherein the streaming manager is further structured to determine that the at least a portion includes all the content of the file system object that is not currently on the storage hardware if the type is an image type.

17. The computing device of claim 15, wherein the streaming manager is further structured to determine that the at least a portion includes all data of a compressed file that is within the file system object if the file system object is compressed and the request is to access any portion of the compressed file.

18. A computer storage medium having computer-executable instructions, which when executed perform actions, comprising:
receiving a request for data of a file system object indicated by a client, the client having a client file system, the client file system having complete file system objects in which all respective content thereof is located on the client file system and file system objects for which no content thereof is located on the client file system, the client having placeholders that represent at least the file system objects in which no content thereof is located on the client file system, wherein placeholders for respective file system objects for which there is no content located on the client file system are accessible to the client as file system objects, the file system object being represented by a placeholder stored on the client file system, the placeholder identifying a remote storage system from which the content of the file system object is obtainable, the client structured to (i) stream the content of the file system object from the remote storage system to an application hosted on the client responsive to determining that a data structure associated with the application indicates that the application is structured to access the content via streaming and the client further structured to (ii) ensure that all of the content of the file system object is available on the client file system responsive to determining that the application is not structured to access the content via streaming, the client ensuring by copying all of the content of the file system object from the remote storage system to the client file system; and
providing the data of the file system object from the remote storage system.

19. The computer storage medium of claim 18, wherein providing the data of the file system object comprises sending all of a compressed file that is within the file system object, the client further structured to request all of the compressed file if the file system object is compressed and the application requests access to any portion of the compressed file.

* * * * *